United States Patent
Mullins et al.

(10) Patent No.: US 6,474,557 B2
(45) Date of Patent: Nov. 5, 2002

(54) PREPAYMENT WRISTBAND AND COMPUTER DEBIT SYSTEM

(75) Inventors: Joseph M. Mullins, Ballwin, MO (US); Donald W. Mills, Jr., Tampa, FL (US)

(73) Assignee: Busch Entertainment Corporation, St. Louis, MO (US)

( * ) Notice: Subject to any disclaimer, the term of this patent is extended or adjusted under 35 U.S.C. 154(b) by 0 days.

(21) Appl. No.: 09/993,280

(22) Filed: Nov. 5, 2001

(65) Prior Publication Data

US 2002/0070275 A1 Jun. 13, 2002

Related U.S. Application Data

(63) Continuation of application No. 09/694,616, filed on Oct. 23, 2000, now Pat. No. 6,352,205.

(51) Int. Cl.[7] .................................................. G06K 7/10
(52) U.S. Cl. ................................ 235/472.03; 235/375
(58) Field of Search ............................. 235/472.03, 375

(56) References Cited

U.S. PATENT DOCUMENTS

| | | | |
|---|---|---|---|
| 4,059,748 A | 11/1977 | Violino | |
| 4,173,408 A | 11/1979 | Stewart | |
| 4,179,212 A | 12/1979 | Lahr | |
| 4,476,381 A | 10/1984 | Rubin | |
| 4,563,739 A | 1/1986 | Gerpheide et al. | |
| 4,672,553 A | 6/1987 | Goldberg | |
| 4,707,592 A | 11/1987 | Ware | |
| 4,732,411 A | 3/1988 | Siegel | |
| 4,835,372 A | 5/1989 | Gombrich et al. | |
| 5,193,055 A | 3/1993 | Brown et al. | |
| 5,218,344 A | 6/1993 | Ricketts | |
| 6,352,205 B1 * | 3/2002 | Mullins et al. | 235/472.03 |

OTHER PUBLICATIONS

Club Med, p. 57, Summer/Fall '92.

* cited by examiner

*Primary Examiner*—Harold I. Pitts
(74) *Attorney, Agent, or Firm*—Storm & Hemingway L.L.P.

(57) ABSTRACT

A financial transaction system that does not require the need for cash, checks or credit cards to carry out financial transactions. In return for prepayment of specified sum, a bar coded wristband is issued to a customer. On issuance of the wristband, a data base record is created that is cross-referenced with the bar code number, as well as an account number, an issue date and a present balance of the account. When the user wishes to purchase goods or services, the bar code of the wristband is scanned, and the amount of the transaction is then placed into the system. The corresponding account is debited. The wristband is constructed so as to be waterproof, and includes an adhesive strip with small tear strips for fastening around the user's wrist. An attempted removal of the wristband is effective to substantially destroy it and render it unusable to other persons.

13 Claims, 4 Drawing Sheets

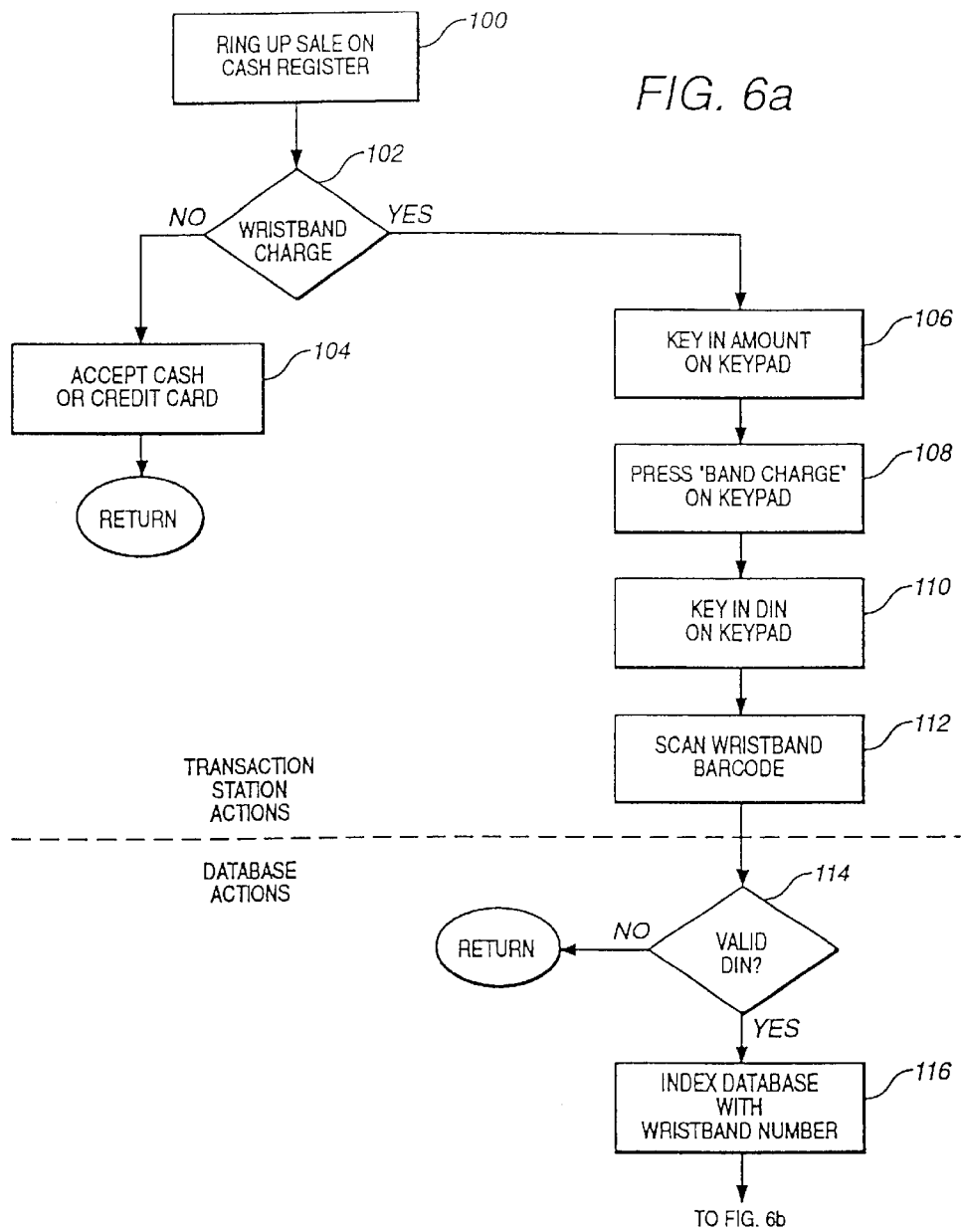

PREPAYMENT WRISTBAND AND COMPUTER DEBIT SYSTEM

RELATED APPLICATION

This application is a continuation of Ser. No. 09/694,616 filed Oct. 23,2000 now U.S. Pat. No. 6,352,205.

TECHNICAL FIELD OF THE INVENTION

The present invention relates in general to computerized accounting systems, and more particularly to a pseudo monetary system in which a prepayment or authorization is initially exchanged for a bar-coded wristband, and subsequent financial transactions are carried out in association with the use of the wristband and debiting the corresponding account by the value of the financial transaction.

BACKGROUND OF THE INVENTION

The time honored system of exchanging cash or legal tender for goods and services is an established custom, and is widely accepted for final payment. Over time, personal business checks have become a customary manner for payment of goods and services without the use of cash.

Even more recently, credit cards have become the recognized technique for purchasing goods and services on credit, and for later payment thereof to the credit card issuing company.

While the foregoing methods of payment represent an established and accepted method for purchasing goods or services, certain shortcomings exist. For example, there exists certain abuses in the use of checks or credit cards which operate to the detriment of businesses. For example, checks and credit cards may be stolen or be worthless and thus uncollectible. Checks can be written with insufficient account funds, thereby providing a business risk to entities accepting the same. Among other disadvantages, certain situations exist in which cash, credit cards or checks cannot be easily carried or used due to the nature of the environment. For instance, in water parks, beaches, bars and in similar environments, it is difficult to conveniently carry cash, checks or credit cards on the person. Nevertheless, in such environments, there is often the opportunity to purchase goods and services which require the exchange of money, a promise to pay, or an authorization to use a credit card for subsequent payment to the vendor. Not only does the use of cash or checks present the opportunity for destruction due to water, there is always the risk of loss due to the inability to safely carry the same in bathing suits and the like. The problem is exacerbated with the use of money by children where currency and change can often be lost, and at the very least, the accountability of financial transactions to assure that the proper change has been received.

Certain of the foregoing problems have been addressed by employing credit cards that are specially issued for particular limited uses, and are limited for a specific period of time. For example, ocean cruise ships utilize a special issue credit card to passengers for purchasing goods and services provided on the ship and only for the duration of the cruise. The special issue credit card is issued after taking an imprint of the passenger's major credit card, to provide authorization for securing final payment through the issuing major credit card company.

Thereafter, the passenger can use the special issue credit card without having to carry cash, personal checks or traveler's checks. The disadvantage to such system is that the special issue credit card can yet be misplaced or stolen, and thus used by an unauthorized person. A computer system is believed to be used with the special issue credit card to totalize the sales transactions so that final payment can be obtained from the major credit card issuer.

In view of the foregoing, it can be seen that a need exists for a pseudo monetary system where cash, checks or credit cards are not required to be carried at all times, but yet where financial transactions can be readily carried out. A further need exists for a pseudo monetary system where an initial payment or authorization is exchanged in return for a device which, itself has no monetary value, but which is only a medium of associating an account in a data base with transactions where the prepayment or authorized amount is reduced or debited. A further need exists for a pseudo monetary system in which it is difficult to lose or subject to destruction the device, but when lost or destroyed, the device cannot be used by others to debit the prepaid or authorized amount.

SUMMARY OF THE INVENTION

According to the invention, a pseudo monetary system is described, wherein a wristband or similar device is initially exchanged for a prepayment or an authorization or promise to pay, and subsequent transactions by the person wearing the wristband are debited against the initial prepayment. If a transaction involves an amount that exceeds a current balance associated with the prepayment, such transaction can either be prevented from occurring, or can be carried out based on an authorized override by-operators of the system.

According to a preferred embodiment of the invention, a waterproof wristband is exchanged for a specified prepayment of money made by cash, or by authorization to pay made by credit card or other acceptable means. The wristband includes at least one bar code that represents a unique number. Further, the wristband has an adhesive section for securing around the wrist of a person. Security slits in the adhesive area prevent the removal of the wristband without destruction thereof. In the preferred form of the invention, the wristband also includes a human-readable number that is identical to the number encoded in the bar code. The identification of the wristband can be quickly acquired either by scanning the bar code of the wristband, or visually by reading the human readable number.

Associated with the wristband of the invention is a computerized accounting system having a central data base connected by a local area network to plural stations having purchase transaction equipment. The computerized accounting system is programmed to initially read the wristband bar code on the issuance thereof, and associate the number with a calendar date of issuance, an account number, the amount of prepayment, and other information. On each subsequent financial transaction involving the wristband, the wristband is again scanned, whereupon the bar code identification number is cross-referenced to the account number and the calendar date. If the issue date of the wristband differs from the date of the present transaction, the transaction cannot be carried out. Further, if the amount of purchase of the goods and services exceeds the current balance of the account, the transaction cannot be completed, except for certain circumstances. If, on the other hand, the date of wristband issuance matches the date of the transaction, and if the purchase amount does not exceed the current balance of the account, the transaction is allowed to continue, whereupon the current balance is debited by the purchase amount. The transactions can routinely continue throughout the day without the use of cash, credit cards or checks, until the purchase amount exceeds the current balance.

Wristbands that have been lost or indicate destruction by removal thereof are voided by the operator of the transaction station, thus providing a degree of additional security to persons who may have inadvertently lost the wristband.

The computerized accounting system is further programmed to provide reconciliation of accounts at the end of the day by refunding unused amounts of cash prepayments, and reconciling credit card accounts to the actual amount spent and thereby bill the credit card companies appropriately. Credit card accounts are automatically reconciled at the end of the day, while cash accounts can be reconciled only on request by the participant and the surrender of the wristband.

BRIEF DESCRIPTION OF THE DRAWINGS

Further features and advantages will become apparent from the following and more particular description of the preferred embodiment of the invention, as illustrated in the accompanying drawings, in which like reference characters generally refer to the same parts or elements throughout the view, and in which:

FIGS. 6a and 6b are flow charts illustrating the programmed operations of a computerized accounting system in processing an exemplary transaction; and FIG. 7 illustrates the correlation of a wristband bar code with associated data base information.

DETAILED DESCRIPTION OF THE INVENTION

Figure 1:
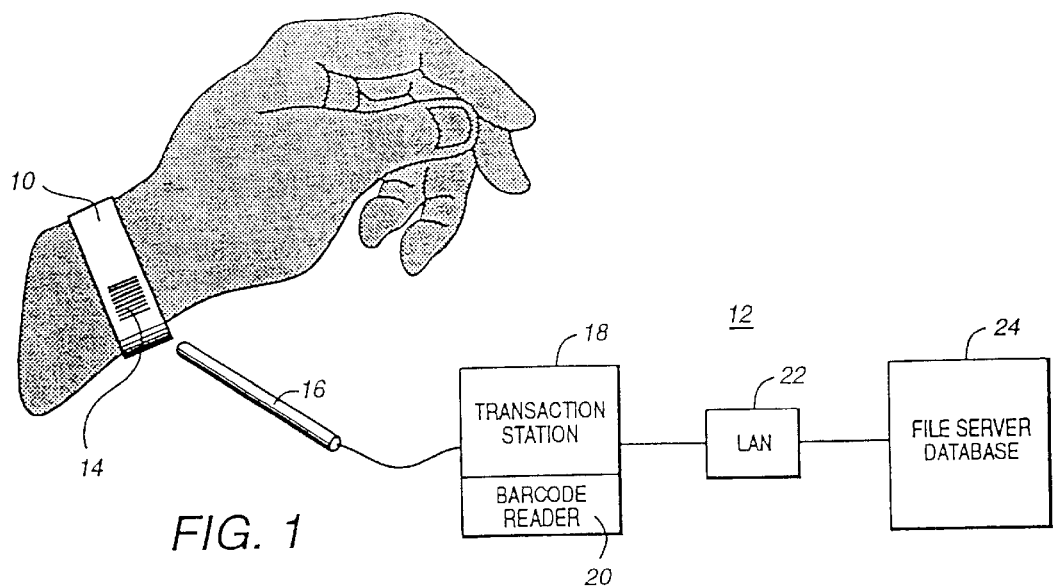
FIG. 1 depicts in simplified form the wristband of the invention utilized in conjunction with a computerized accounting system.

With reference now to FIG. 1, there is illustrated the wristband 10 and the computerized accounting system 12 according to the preferred embodiment of the invention. The wristband 10 is fabricated so as to be secured around the wrist of a user, and includes a bar code 14 or other identification, which can be input into the computerized accounting system 12 and associated with a specified prepayment. The computerized accounting system 12 includes a bar code reader 20 and a laser wand 16 and associated electronic transaction equipment 18 for decoding the scanned signals and transforming the same into digital signals. The financial transaction equipment 18 can be associated with other computerized equipment for operation with a local area network 22, in the event a number of transaction stations 18 are employed. The local area network 22 connects each of the transaction stations 18 with a central data base, comprising a file server 24.

In brief summary of the operation of the system, a user initially exchanges a specified amount of money by way of cash or provide authorization to pay via a credit card, in return for a wristband 10. The laser wand 16 is utilized to initially scan the bar code 14 of the wristband 10, and input other data via the transaction station 18 for transferring the information to the file server data base 24. The computer of the file server data base 24 associates the bar code number 14 with a issue date, an account number, the amount of prepayment or authorization, as well as other useful information. During subsequent financial transactions in which the user desires to purchase goods or services, the bar code 14 of the wristband 10 is again scanned, and the purchase amount data is input into the transaction station 18 and transferred to the file server 24. If the transaction amount does not exceed the current balance for that account number, the transaction is allowed to be carried out, and the account is debited by the transaction amount. On the other hand, if the transaction amount exceeds the current balance of that account, the computerized accounting system 12 can prevent the transaction from being completed. As will be described in more detail below, the computerized accounting system 12 can be programmed to accept authorization to complete the transaction when the transaction amount exceeds the current account balance. The foregoing system is highly advantageous as cash, checks or credit cards do not need to be carried by the user throughout the day, rather only the wristband 10 is required for each financial transaction.

Figure 2:
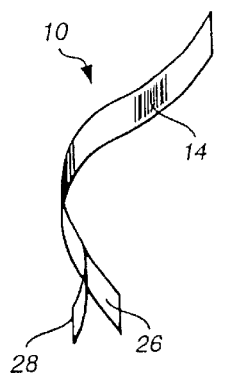
FIG. 2 is an isometric view of the wristband, illustrating the-use of a peel strip to expose an adhesive section for fastening the wristband to a user.
Figure 3:
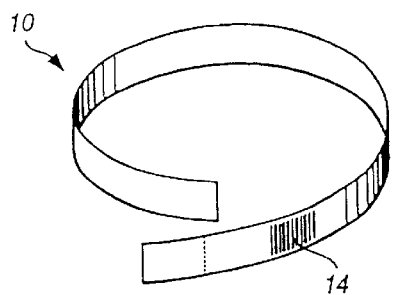
FIG. 3 illustrates the manner in which the wristband is attached to a user.
Figure 4:
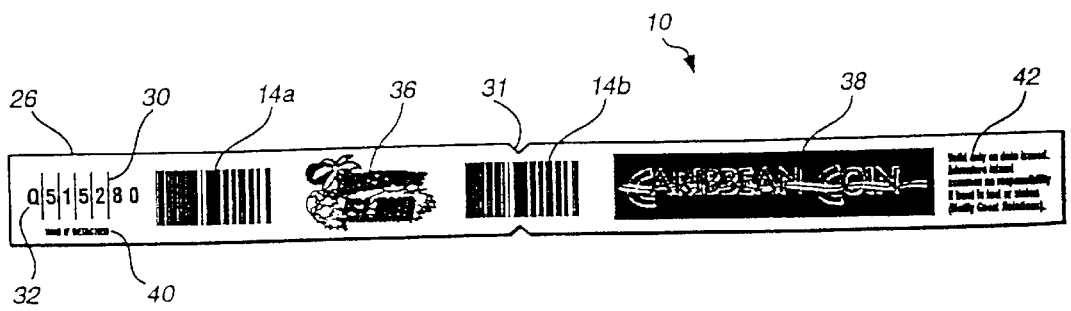
FIG. 4 is a plan view of the wristband of the preferred embodiment of the invention, showing the duplicated bar codes and the human readable identification.

With reference now to FIGS. 2–4, there is illustrated the wrist band preferred embodiment of the invention. The wristband 10 is about nine and one-half inches in length and three-fourths inch in width, thereby affording a size that can be used in a wide variety of wrist sizes. The wristband 10 is constructed of a base material comprising a white paper.

As shown in FIG. 2 the wristband 10 has on the back side thereof an area having an adhesive backing 26 protected by a peel strip 28. Hence, when it is desired to secure the wristband 10 around the user's wrist, the peel strip 28 is removed, thereby exposing the adhesive area 26. The wristband can then be wrapped around the wrist in the form shown in FIG. 3 to thereby adhere the wristband onto itself in a semi-permanent manner.

In FIG. 4, there are shown the various printed indicia formed on the wristband and protected by the waterproof coating, comprising a smudge proof Kimdura protective cover. The wristband is then covered with a waterproof varnish comprising a clear matte polyester laminate. With such construction, the wristband 10 is flexible but yet is durable and resistant to easy tearing, destruction, smearing or obliteration of the bar code.

In accordance with an important feature of the invention, security slits 30 are formed through the wristband in the adhesive section 26. The security slits 30 can be formed either vertically or diagonally to define areas of weakness so that the wristband tears in such area should attempts be made to forcefully separate the wristband when adhered to itself, such as when secured to a wrist. The purposeful removal of the wristband 10 is accomplished by forcefully pulling on the wristband until it tears along the security slits 30. Thus, a wristband 10 that either has the peel strip 28 removed, or is torn along the security slits 30 is automatically invalidated and cannot thereafter be used. Attempted reuse of a wristband 10 torn along the security slits 30 is visually perceptible and easily detected. This prevents persons from forcefully removing wristbands from other persons and using the same in an unauthorized manner. Should a wristband 10 become inadvertently torn along the security slits 30, it can be replaced on the showing of proper identification of the person. Other areas of weakness in the wristband 10 can be notches 31 formed in the edges of the wristband material. The notches 31 allow tearing of the wristband material, preferably through the bar code area, thereby preventing reading of the bar code. Otherwise, the notches 31 serve the same purpose as the security slits 30 described above.

It should be realized that the wristband is not constructed of a highly durable or tear resistant material, thereby enabling the wristband 10 to be forcefully removed should it catch or snag on stationary protruding objects when the person is moving. For example, the wristband is separable from the user if snagged when the person slides down a waterslide. Injury to the person in such situations is thus avoided.

According to the preferred form of the invention, the wristband 10 includes a first bar code 14a and a second, identical bar code 14b, to provide versatility for convenient reading of the code. Further, a human readable number 32 is provided in the area of the security slits 30. Two identical bar codes 14a and 14b are utilized so that access to at least one bar code is readily available when scanning the same while attached to a user's wrist. It may be found that only a single bar code is acceptable.

Those skilled in the art may find that identifications other than bar codes can be utilized to associate the user with an account number in the data base. For example, the user's name itself may be sufficiently unique, and can be made or printed on the wristband at the time of issuance. Also, the human readable number need not be the same as the bar code number, but can be a related number or designation.

Graphic areas 36 and 38 may be employed for promotional purposes. Further, various instructional messages or text, such as shown in areas 40 and 42 may provide the user with appropriate instructions concerning the use of the wristband, disclaimers, etc.

While the bar codes 14a and 14b can be of any conventional type compatible with scanning equipment, the preferred form of the invention utilizes bar coding in the base 36, and a code 39 type of bar code. The bar codes 14 are imprinted on the wristband with a density of 7 characters per inch. Also, the bar code 14 is of the Midax image. It should be understood that many other types of bar codes or encoding schemes can be utilized to uniquely identify each wristband 10, and associate it with data in the file server data base 24. The wristbands invention can be made substantially identical, except for the bar codes 14. However, different styles of wristbands can be made with different overall colors in association with different prepayment amounts. For example, red colors in the graphic areas 36 and 38 may indicate that the wristband 10 can be utilized in exchange for $10.00. Further, a magenta color of the graphic areas 36 and 38 may indicate that the wristband can be exchanged for $25.00. Many other types of predefined exchange values can be realized. Further, yet another color of the graphic areas 36 and 38 can indicate a variable exchange amount that is agreed upon by the user and the operator of the transaction stations 18. With a variable exchange amount, a child or other person can obtain a wristband 10 with the pocket change that the person has, such as $2.38.

Figure 5:
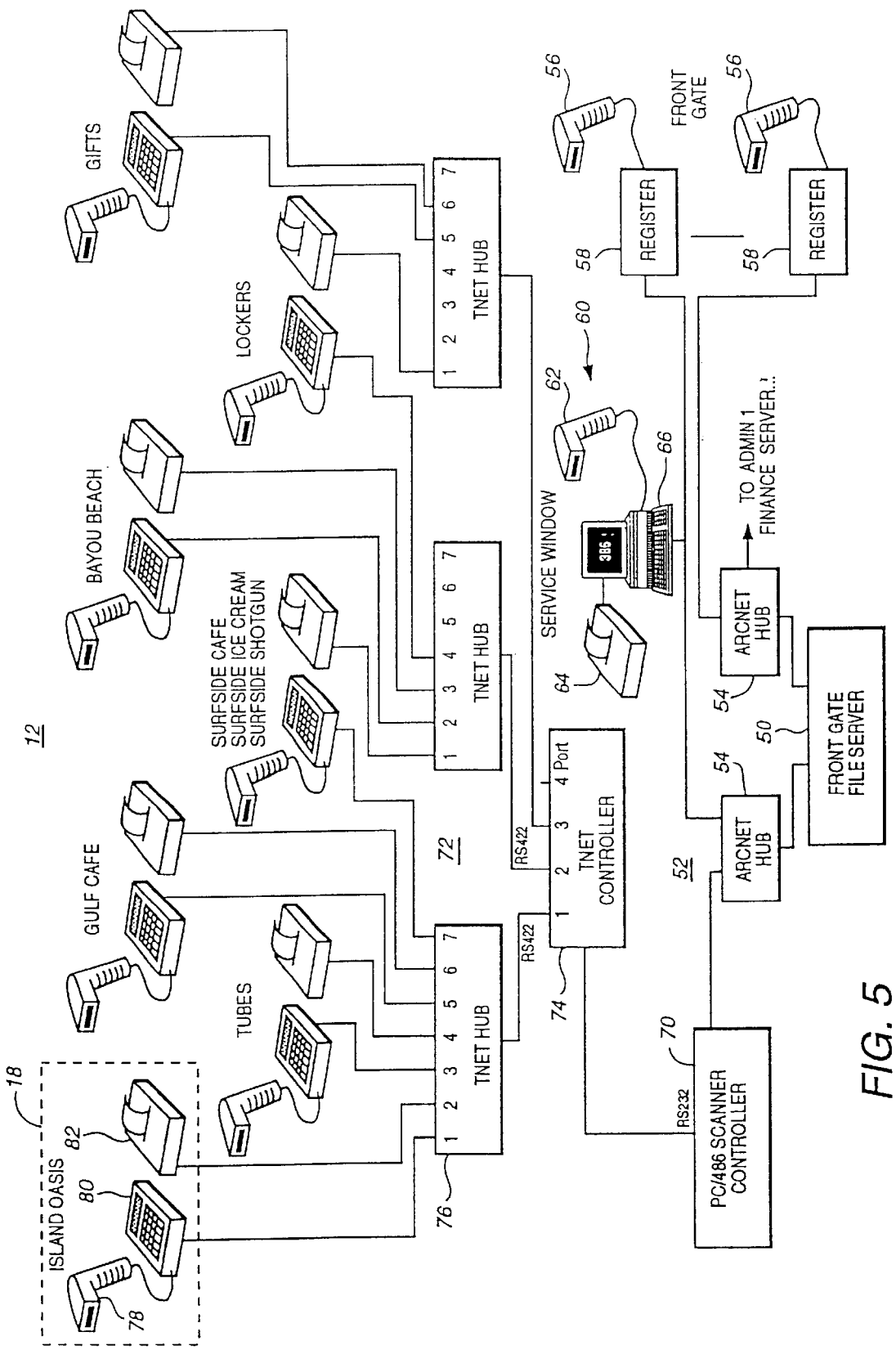
FIG. 5 is a block diagram of the computerized accounting system, illustrating the connection of a file server data base via a LAN system to plural transaction stations.

With reference to FIG. 5, there is illustrated the computerized accounting system 12 invention. Although the invention may find a wide variety of applications in a number of different fields, the accounting system 12 of FIG. 5 is particularly adapted for use in an entertainment park of the type where many water activities are available, thus avoiding the use of cash, checks or credit cards, which would be burdensome or easily lost. The computerized accounting system 12 includes a file server 50 connected by a high speed local area network 52 having plural hubs 54 connected to other equipment. The high speed network hubs 54 are connected in the preferred embodiment to bar code readers 56 and registers 58 located at a front gate of the water park. The front gate bar code readers 56 and registers 58 are utilized for exchanging credit or cash in return for wristbands 10 described above. Numerous front gate transaction stations can be employed to accommodate customers, and are connected to the file server 50 by way of the high speed hubs 54. Also connected to the file server 50 is equipment located at a service window, such as shown by reference character 60. The service window 60, or service counter, includes a bar code reader 62, a register 64 and a personal computer 66, connected to the high speed network 52. Lost and broken wristbands 10 and other associated problems can be addressed by the users at the service windows 60. Further, the depleted individual accounts can be reestablished at the service window.60 for the payment of additional cash or extended credit by way of credit cards. One high speed network hub 54 is shown connected to an additional administrative finance server for providing administrative reports and other data or statistics with respect to the system 12.

A personal computer scanner-controller 70 is effective to connect a lower speed network 72 to the file server 50, via one of the high speed hubs 54. The scanner controller 70 is connected by an RS232, or other similar communication link, to a multi-port controller 74. Each port of the controller 74 is connected to a hub, such as shown by reference numeral 76. Each port of a hub 76 is connected to the equipment of various transaction stations 18, each having a bar code reader 78, a keypad 80 and a register 82. One or more of the transaction stations 18 can be located at activity centers of the water park, such as beaches, lockers, restaurants, water slides, etc. As noted in FIG. 5, each network hub 76 accommodates only a specified number of transaction stations 18, thus necessitating a number of hubs 76 to accommodate a suitable number of transaction stations 18. In the preferred form of the invention, the low-speed network 72 comprises a Tnet network while the high speed network 52 comprises an Arcnet network.

The transaction stations 18 are located where the purchase of goods or services is desired by the users of the wristbands 10. In order to purchase goods or services, the user requests the same at a transaction station 18. The operator or attendant of the transaction station 18 then rings the sale and tax on the register 82, and keys the transaction amount on the keypad 80. Further, the operator keys a daily identification number (DIN) into the keypad 80. Lastly, the attendant scans the user's wristband 10 with the bar code reader 78. The register 82 provides the user with a printed receipt of the transaction. The amount of the transaction is input into the accounting system 12 by way of the keypad 80, and then a "band charge" key is depressed.

According to the accounting system 12 of the invention, the daily identification number (DIN) is assigned to each transaction station operator to achieve a high degree of security by maintaining the operator's and the input of data of each transaction station 18 independent of each other. The daily identification number of each attendant changes from day to day, and is different with respect to each attendant. This procedure thereby isolates the transactions of each attendant from the others, and makes the attendant responsible for the data and transactions input into the accounting system 12.

In carrying out an exemplary transaction, the scanning of the wristband bar code 14 inputs the unique wristband number into the system. The accounting system 12 uses the wristband number as an index for searching the data base 50 to find the related account number and the balance remaining therein. Various transactions involving the purchase of goods, such as souvenirs, etc., and services such as rides, water sports, etc., can all purchased using the wristband 10.

Figure 6B:
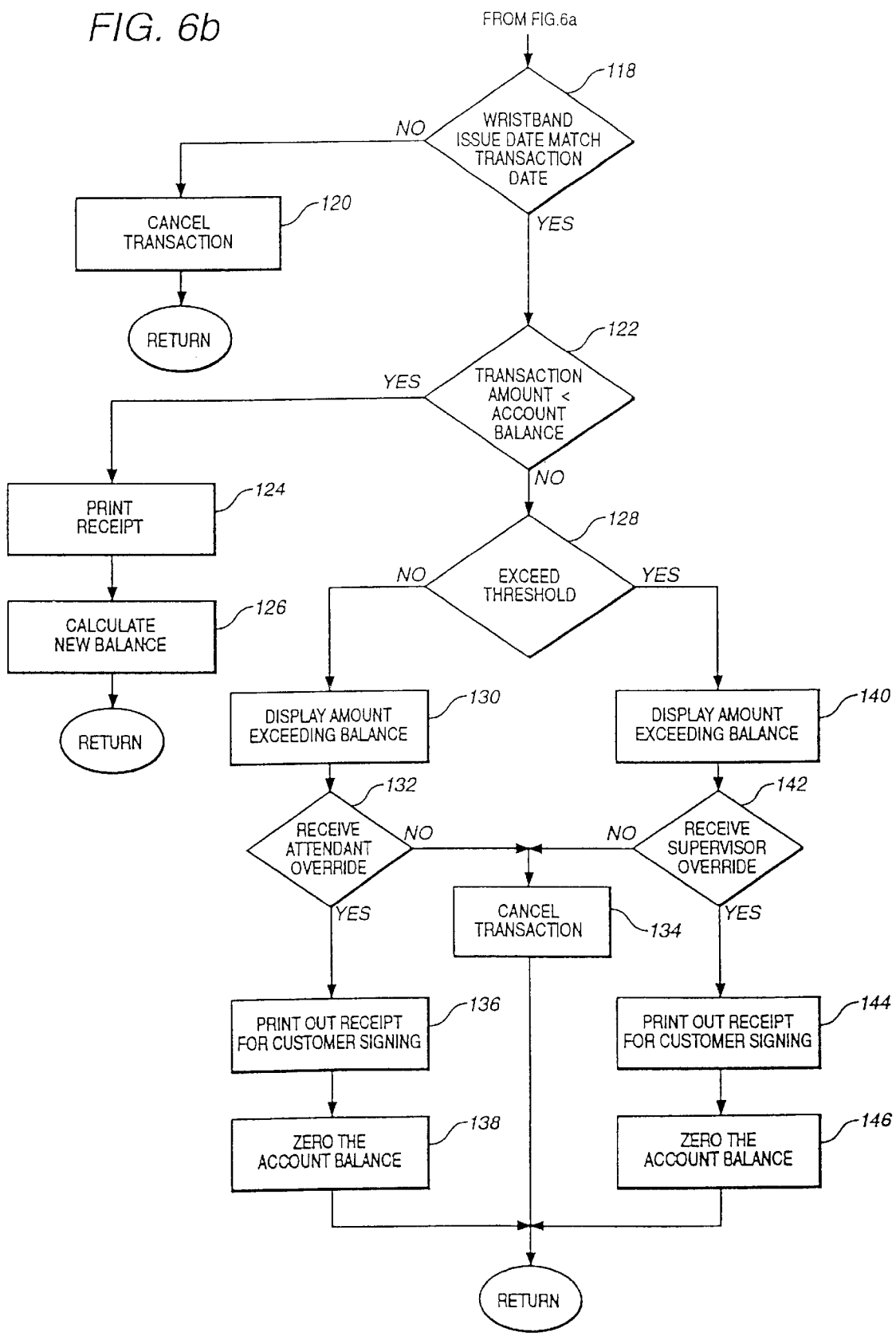

The operations an exemplary transaction, as carried out by the transaction stations 18 in conjunction with the computerized accounting system 12 are shown in FIGS. 6a and 6b. With specific reference to FIG. 6a, reference numeral 100 illustrates the operation wherein a customer requests a purchase of either goods or services at a transaction station 18. The attendant at the transaction station 18 rings up a sale on the cash register 82 corresponding to--the value of the goods and services.

Next, and as illustrated in decision block 102, the attendant determines whether the payment will be by way of the wristband charge. If the payment is not by use of the wristband 10, then the cash or credit card exchange takes place as shown in program flow block 104. On the other hand, if the customer wishes to utilize the wristband 10 as the medium for pseudo money, then the attendant keys in the amount on the keypad 80. This is shown in program flow block 106. As noted in block 108, the attendant at the transaction station 18 depresses the "band charge" key on the keypad 80 as well as the daily identification number (DIN) as shown in block 110. Then, the attendant scans the bar code 14 on the wristband 10 as shown in block 112. The foregoing information is all transferred from the transaction station 18, via the low speed network 72 and the high speed network 52 to the data base, or file server 50.

When the data base file server 50 receives such information, a determination is made as to whether the DIN is valid or invalid, as noted in decision block 114. If the DIN is invalid, then no further action is carried out by the data base, except by notifying the attendant of an optional input for the correct DIN. On the other hand, if the DIN is correct, the wristband number 14 is utilized as an index for searching the data base 50 for the appropriate account number. This is shown in program flow block 116.

With brief reference to FIG. 7, there is shown in example form the manner in which the file server data base 50 utilizes the wristband number 14 as an index for searching the data base. As can be appreciated, one or more wristbands can all be associated with a single account number. For instance, a family of five members may each have a wristband, each with a different bar code number 14. However, the family may have a single account with a single prepaid balance. Hence, when any one of the wristband numbers is compared with the wristband numbers of the data base, at least one match will be found. The match directs the data base file server 50 to the appropriate account number, which has associated therewith the issue date of the wristbands 10 and the account balance. It should be understood that other types of information can also be associated with the account number, such as names of the users, credit card issuing company, expiration date, credit card number, etc. While the example shows a number of wristband numbers associated with a single account number, each wristband 10 may be opened with its own account number and against which subsequent purchases are debited only by the user of the wristband 10.

In FIG. 6b, decision block 118 indicates the programmed operations in which the wristband issue date is compared with the present transaction date. As noted above, the preferred embodiment of the invention contemplates that a wristband 10 is valid only for a single day, and thus transactions on the date of issue of the wristband are the only valid transactions that can take place. If the issue date of the wristband 10 differs from the transaction date, program flow branches to block 120 where the transaction is canceled, and in any event, it cannot be carried out. An affirmative result of decision block 118 transfers processing to decision block 122 where it is determined if the transaction amount is less than the account balance. If an affirmative result ensues, the transaction station 18 is caused to print a receipt, as shown in block 124, and a new account balance is calculated as shown in program flow block 126. While not shown in the flow chart, many record and statistical types of data are maintained, but are not necessary for the practice of the invention.

In the event the transaction amount is greater than the account balance, program flow branches from block 122 to decision block 128. According to an important feature of the invention, certain transactions exceeding the account balance can be approved and carried out, based on various levels of personnel approval. In other words, if the transaction exceeds the account balance by a small amount less than a threshold amount, then approval by the transaction station attendant is sufficient to allow the transaction to proceed. On the other hand, if the transaction amount exceeds the account balance substantially above a threshold amount, then supervisor approval may be required. The threshold can be preprogrammed into the data base file server 50 as a percent of the initial prepaid amount, or the threshold can be programmed as a fixed dollar amount. Further, the threshold can be variable depending on various other parameters.

The remainder of the flow chart of FIG. 6b can be best understood based on an example. If there is $15.00 remaining as the account balance, and a customer has offered payment by way of the wristband 10 for a meal that is $16.00, and assuming a threshold of $17.00, then program flow branches from decision block 128 to block 130. Here, the data base file server 50 provides a display to the transaction station attendant of the exact dollar amount by which the transaction exceeds the present balance. In decision block 132, the attendant has the discretion of allowing or disallowing the transaction to continue by the input in the keypad 80. If the attendant decides not to authorize the transaction, a negative input on keypad 80 is received by the data base file server 50, whereupon the transaction is canceled. This is shown in program flow block 134. If the attendant provides an affirmative input on the keypad 80, program flow proceeds to block 136 for carrying out the transaction. In this block, a printout receipt is obtained from the register 82 and is presented to the customer for signing. Program flow block 138 is then carried out, where the account balance is zeroed, and no further transactions involving the wristband 10 can be carried out until a further prepaid amount is submitted.

In the example noted above with respect to decision block 128, the account balance was $15.00 and the threshold was $17.00. If, for example, the customer has purchased a meal for $20.00, then such amount exceeds the threshold, and program flow branches to block 140. The transaction amount that exceeds the present balance is displayed to the transaction station attendant on the keypad 80. Additionally, the attendant is provided with a visual indication that supervisor level approval is required in order to continue the transaction. In situations such as noted in the example, it may be better to risk receiving payment for the excess balance, rather than refuse service to the customer and waste the food unnecessarily. If such a situation exists, then the supervisor of the attendant can provide approval by inputting a special code or key into the keypad 80. This is shown in program flow block 142. If no supervisor approval is input, but rather a negative response is provided, program flow branches from decision block 142 to block 134 where the transaction is canceled. On the other hand, if an affirmative response is input by the supervisor, program flow branches to block 144 where a printout receipt is provided to the customer for signing.

The receipt signed in program flow blocks 136 and 134 is preferably of the type suitable for use with credit cards to secure payment thereof. Advantageously, if prepayment for the wristband 10 was by way of credit card, such information can be stored in the data base, in association with the account number. Again, the account balance is reduced to zero, as noted in program flow block 146.

While the preferred programming of the computerized accounting system 12 accommodates the authorization of transactions exceeding the account balance, other situations may dictate that such an option is unnecessary or undesirable.

While not shown in program flow block form, the computerized accounting system 12 is also programmed to reconcile accounts at the end of each business day. If cash was utilized as a prepayment for one or more wristbands, then such wristbands can be surrendered at the end of the day, the account reconciled, and any excess returned to the customers. On the other hand, if prepayment was by way of credit card, the customers do not need to surrender the wristbands, and at the end of the business day the computerized accounting system 12 automatically reconciles the account and issues a credit to the appropriate credit card company for the difference between the prepaid amount and the balance existing at the end of the day. Those skilled in the art may find that many other techniques may be utilized for reconciling the various accounts.

While the foregoing preferred embodiment of the invention has been described in conjunction with an entertainment park, the invention may find a variety of applications in other areas, such as retail merchandising and other gaming or entertainment businesses. Also, while a wristband is utilized in connection with the preferred embodiment, other articles attached to a user can be employed with equal effectiveness. For example, finger rings, belts, armbands, pendants, T-shirts, sunglasses and other articles can be used with identifications thereon to associate the user with an account in a computerized data base. According, it is to be understood that many changes in detail may be made as a matter of engineering or programming choices, without departing from the spirit and scope of the invention, as defined by the appended claims.

What is claimed is:

1. A transaction system, comprising:

at least one article usable in lieu of money, said article being attachable to a user and bearing an identification, and said article being usable for financial transactions to purchase goods and services for a predetermined period of time;

a computerized accounting system programmed to initialize an account associated with said article when issued to a user, said accounting system being programmed to accept said identification of said article and a date of issuance of said article to the user and programmed to maintain in association therewith an initial monetary value to be credited to the associated account; and said accounting system being programmed to thereafter respond to a purchase transaction for a predetermined period of time after issuance of said article to the user by accepting said identification of said article in conjunction with a monetary value of a purchase and arithmetically debiting a balance maintained in the associated account in the computerized accounting system in association with the article identification.

2. The transaction system of claim 1, wherein said article is constructed so as to be attachable to the user and not reusable by another person once removed from the user.

3. A method of carrying out financial transactions, comprising the steps of issuing an article usable in lieu of money, attachable to a user, having an identification thereon;

inputting the article identification and a predetermined time period for use thereof into a computer data base;

associating the article identification in the data base with an account; and in response to a request for the purchase of goods or services by a user of the attachable article, inputting the article identification into the computer data base and comparing if a time of the request for the purchase is within said predetermined time period, and if so, debiting the account in the data base by the requested purchase amount of the good or services.

4. The method of claim 3, further including inputting the attachable article identification into the computer data base by scanning a bar code on the attachable article.

5. The method of claim 3, further including providing a unique identification on each attachable article issued.

6. The method of claim 3, further including associating a plurality of different attachable article identifications in the data base with a single account number.

7. The method of claim 3, further including forming plural identical bar codes on the attachable article for facilitating the scanning thereof while attached to a user.

8. The method of claim 3, further including providing a human readable identification and a machine readable identification on the attachable article.

9. The method of claim 3, further including prohibiting purchase transactions of goods and services when a requested purchase amount is greater than a balance in the data base account associated with the attachable article identification.

10. The method of claim 3, further including associating the attachable article identification in the data base with a credit card number and a name of a user of the credit card.

11. A transaction system, comprising:

a plurality of attachable articles, attachable to respective persons, said attachable articles each providing a machine readable identification thereon that is unique with respect to each other;

a reader for reading the identification of the attachable article;

a computer system programmed to associate the plural identifications with a single account; and said computer system being programmed so as to be responsive to receipt of any one of the identifications for accessing the single account and debiting the account is according to a respective transaction cost, and providing a resulting current balance of the account, whereby financial transactions can be carried out without using cash.

12. The transaction system of claim 11, further including a plurality of transaction stations, and wherein said computer system is coupled to the plurality of transaction stations, each having a reader for reading the identification of the attachable article, and including a device to input transaction data into the computer system.

13. The transaction system of claim 11, further including at least one initialization type transaction coupled to the computer system for issuing the attachable articles to the users and inputting the respective identifications into the computer system, and for associating the account with the attachable article identifications, and including at least one transaction station of a second type coupled to the computer system for carrying out financial transactions by inputting at least one of the identifications and a corresponding monetary transaction amount into the computer system for the payment of goods or services.

* * * * *